United States Patent [19]

Stockum et al.

[11] Patent Number: 5,301,240
[45] Date of Patent: Apr. 5, 1994

[54] HIGH-SPEED VIDEO INSTRUMENTATION SYSTEM

[75] Inventors: Larry A. Stockum, Gahanna; Ronald L. Gorenflo, London, both of Ohio

[73] Assignee: Battelle Memorial Institute, Columbus, Ohio

[21] Appl. No.: 941,852

[22] Filed: Sep. 8, 1992

Related U.S. Application Data

[63] Continuation of Ser. No. 628,320, Dec. 14, 1990, abandoned.

[51] Int. Cl.⁵ .................. G06K 9/00; G06K 9/20; H04N 7/18
[52] U.S. Cl. .......................... 382/1; 382/48; 348/22; 348/220; 348/416
[58] Field of Search ............... 382/1, 48; 358/93, 105, 358/108, 135, 136; 340/541

[56] References Cited

U.S. PATENT DOCUMENTS

| | | | |
|---|---|---|---|
| 3,590,151 | 6/1971 | Keith | 178/6.8 |
| 4,322,638 | 3/1982 | Lee et al. | 307/311 |
| 4,322,752 | 3/1982 | Bixby | 358/123 |
| 4,330,796 | 5/1982 | Anagnostopoulos et al. | 358/213 |
| 4,496,995 | 1/1985 | Colles et al. | 360/9.1 |
| 4,752,897 | 6/1988 | Zoeller et al. | 364/550 |
| 4,772,945 | 9/1988 | Tagawa et al. | 358/108 |
| 4,774,570 | 9/1988 | Araki | 358/108 |
| 4,777,526 | 10/1988 | Saitoh et al. | 358/108 |
| 4,789,894 | 12/1988 | Cooper | 358/105 |
| 4,855,943 | 8/1989 | Lewis | 364/575 |
| 4,999,614 | 3/1991 | Ueda et al. | 340/588 |
| 5,034,811 | 7/1991 | Palm | 358/105 |

FOREIGN PATENT DOCUMENTS

| | | | |
|---|---|---|---|
| 0261917 | 3/1988 | European Pat. Off. | H04N 5/14 |
| 9107053 | 5/1991 | World Int. Prop. O. | H04N 5/91 |
| 9108644 | 6/1991 | World Int. Prop. O. | H04N 5/335 |
| 9115917 | 10/1991 | World Int. Prop. O. | H04N 3/77 |

OTHER PUBLICATIONS

Image Transmission Techniques; W. K. Pratt et al; Academic Press; Orlando, US; 1977; pp. 198-202.
A Digital Television Sequence Store; Robert Johnston et al; IEEE Transactions on Communications; vol. 26, No. 5; May 1978; pp. 594-600.
A Solid State "Action Replay" Recorder; D. J. Woodham; 16th International TV Symposium-Broadcast Session, Montreaux, Switzerland, Jun. 17, 1989; pp. 289-295.

Primary Examiner—Michael T. Razavi
Assistant Examiner—David Fox
Attorney, Agent, or Firm—Klaus H. Wiesmann

[57] ABSTRACT

An imager and an analog to digital converter yield a series of digital signals from successive frames of images of scenes in which selected types of high-speed events may take place. The signals are sampled, and changes in the sampled signals typically indicative of such events are detected. Random access memory temporarily stores a sequence of the signals including each such changed signal. Analytic circuitry determines whether the sequence contains a record of such an event, and, if it does, provides a videotape record of the event.

16 Claims, 10 Drawing Sheets

Microfiche Appendix Included
(1 Microfiche, 61 Pages)

HIGH-SPEED VIDEO INSTRUMENTATION SYSTEM

This is a continuation of copending application Ser. No. 07/628,320 filed on Dec. 14, 1990, abandoned.

MICROFICHE APPENDIX

A microfiche appendix of a computer program listing entitled "HIGH-SPEED VIDEO INSTRUMENTATION SYSTEM", consisting of one microfiche with 61 frames has been submitted.

FIELD

This invention relates to a high-speed video instrumentation system that records and stores video images at high data rates. In particular the system comprises a video camera that records video images at a high data rate (e.g. up to about 22,000 frames per second) with automatic triggering and storage of images by real time processing of the image to detect the occurrence of events, and digital storage and playback of the images on a PC based computer system.

BACKGROUND

Engineers, scientists, and photographers often require electro-optical instrumentation systems that can capture images during high-speed random or catastrophic events, and produce the resulting data in minutes or even seconds. Examples of such events are explosive tests and material stress tests where the time of explosion or failure is not predictable. Near real-time playback of the recorded data is often needed to verify that the instrumentation set up is adequate.

High-speed film cameras can capture high-speed events if a pre-event trigger is available to allow the camera to ramp up to speed before the crucial event takes place, but the film must be developed and further processed in order to obtain any data. The common technique for recording these events with high-speed film cameras is to attempt to start the recording before the event occurs and to record long enough to capture the event. Since 10,000 frames-per-second film cameras can record for less than 5 seconds, this technique does not permit recording events with uncertainty in occurrence time.

High-speed video cameras are available that can collect images at frame rates up to 2,000 frames per second, and partial frames up to 12,000 segments per second but also require external triggers. These video cameras do not process the images on the fly for automatic event triggering and the storage medium is nonstandard video tape of limited length. The equipment requires a large amount of space.

A patent of interest for its teaching in this area to Cooper, U.S. Pat. No. 4,789,894, discloses a motion analyzer which records scene information at a high frame rate and plays back such information at a slower frame rate, thereby allowing slow motion analysis of a moving object. Full frames of video information from two video imagers are recorded in interleaved fashion on magnetic tape. The device is stated to have a recording frame rate of 30 to 1,000 frames per second. In the background discussion a Kodak SP2000 Motion Analysis System is discussed having a frame rate of 60 to 2,000 frames per second.

A further patent of interest to Bixby, U.S. Pat. No. 4,322,752, discloses area image sensor apparatus and methods for readout of solid-state image sensors at fast frame rates. In a preferred embodiment where photosites are arranged in rows and columns, the sensor is read out in "blocks" of photosites, with each block being comprised of a plurality of adjacent photosite rows. A block of photosites is enabled by the application of an enablement signal to the photosites within the block; and a column address signal is sequentially applied to the photosite columns to effect column-wise readout of the photosite rows within the enabled block. The output signal so produced is, therefore, comprised of block information in a "serial" format, while the information content of each block is comprised of a plurality of line signals in a "parallel" format, such line signals corresponding to the individual photosite rows within that block. Other block readable sensors are disclosed in patents to Lee et al, U.S. Pat. No. 4,322,638 and to Anagnostopoulos et al, U.S. Pat. No. 4,330,796.

A further patent of interest to Colles et al, U.S. Pat. No. 4,496,995 discloses a fast frame recorder apparatus for providing slow motion replay.

A further patent of interest to Lewis, U.S. Pat. No. 4,855,943, discloses an electronic camera for electronically recording and displaying a plurality of images, having a selection feature for proofing the images of each display frame to retain only those images desired by the photographer. One embodiment provides an imaging means of one or more displays for forming an image from an optical scene. A converter coupled to the imager converts the image into digital signals. Associated with each display device is a selecting means for selecting the image associated with the device for more permanent storage in a larger addressable memory. An optional transmitting feature unloads selected images from the addressable memory for transmission to a viewer or printer. The invention described provides for proofing, viewing, storing, a plurality of still pictures simultaneously.

A further patent of interest to Zoeller et al, U.S. Pat. No. 4,752,897, discloses a system for the monitoring and analysis of large amounts of data, and particularly to a web defect detection and analysis system. A continuous process is monitored using digital signal processing to provide a continuous flow of first digitized signals. Means are provided continuously and in parallel upon the first digital signals for reducing the first digital signals into a continuous flow of second digital signals occurring at a reduced rate from the rate of flow of the first digitized signals. These second digital signals represent predetermined events in the process, such as critical parameters and defects in a web, when the process is the production of webs of high quality. Finally, means are provided which are responsive to and operative continuously upon the second digital signals for providing outputs representing the analysis of certain effects in the process represented by the events, for example outputs representing statistical quality control information as to the categories location and even the source of the events (e.g. the defects or imperfections in the web).

The present invention comprises a solid state high-speed video camera with automatic event detection and recording of images for playback of selected images within minutes of the event. For example, a prototype has been developed which operates at up to 12,000 frames per second, detects events asynchronously, stores 4,096 images for each event and displays selected images on a PC computer system. These and other advantages of the invention will be evident from the more detailed description herein of the method and apparatus of this invention. Additional details are contained in the Appendix including a report entitled "High-Speed, Video Camera/Event Detector/Recording System".

SUMMARY OF THE INVENTION

The apparatus for providing records of selected types of high-speed events generally comprises (A) means for providing an ordered series of digital signals responsive to successive frames of images of scenes in which such events may take place, (B) means for sampling the signals, means responsive to the samples, for detecting a predetermined characteristic in the signals typically indicative of the occurrence of a selected type of event, and (C) means for storing, at least for a predetermined time, a predetermined portion of the signals in the vicinity of each signal from which the characteristic is detected, so that it can be determined from the stored portion whether it contains a record of an event of a selected type. The apparatus also may comprise means responsive to the signals stored by the storing means D, for determining whether they contain a record of a selected type of event, and, if they do, for providing a record of the event that will endure for at least a predetermined time. The means E may comprise means for providing a permanent record of each detected event of a selected type.

In another embodiment includes apparatus for obtaining a video record of high-speed events for subsequent display, wherein a. the signal-providing means A comprises first means to continuously convert an image scene to a plurality of channels of analog electronic signals; and second means to convert the analog electronic signals to digital electronic signals representing sequential image frames; b. the sampling means B comprises third means to store a predetermined number of the sequential image frames in memory; and c. the detecting means C comprises fourth means for processing of the sequential image frames to accomplish detection of an event. The apparatus may also comprise fifth means to display and/or record selected image frames from the stored sequence of frames. The fourth means may also comprise sixth means to monitor and/or record the digital electronic signals representing the image scene at a slower frame rate. Seventh means to print a permanent record of the digital data representing the selected image frames may be used. The fourth means may comprise real time image processing means. Alternatively, the apparatus has first means that comprises a lens for focusing on an imager, and means to simultaneously address portions of the imager to read out a sequence of analog electronic signals representative of the intensity of light on individual pixels of each portion of the imager. The imager may be a solid state imager that can be at least a 64×64 pixel photodiode array and each portion of the imager comprises at least 32×4 pixels which are read out as thirty-two channels or at least a 256×256 pixel photodiode array. Preferably, the third means comprises a solid state dynamic random access memory to temporarily store the sequence of image frames. Preferably at least about 4,096 most recent in a sequence of frames are stored until commanded to stop storing new frames. If desired the fourth means may comprise an external trigger for commanding semi-permanent storage of a selected sequence of image frames. The fourth means may comprise means to sample selected pixels from a sequence of frames to determine changes in the scene which signal the initiation of an event and triggering semi-permanent storage of a selected sequence of image frames including image frames prior to the event.

The means C responsive to the samples, for detecting a predetermined characteristic in the signals to accomplish detection of an event preferably comprises: a. first means to compare the value of individual sample pixels with the average preceding values for the individual pixels for a predetermined number of prior frames and to increment a counter when the comparison exceeds a predetermined threshold value and activate a trigger when the counter increments to a predetermined value in a single frame; and/or b. Second means to compare the value of an individual pixel with the value of the pixel in the preceding frame and to increment a counter when the comparison exceeds a predetermined threshold value and to activate a trigger when the counter increments to a predetermined value in a single frame.

DETAILED DESCRIPTION OF THE INVENTION AND PREFERRED EMBODIMENT

This invention relates to apparatus and method for capturing images of high-speed events. A prototype solid state high-speed video camera, event detection, and recording system was designed, fabricated, and demonstrated. This prototype is designated as HFR-1264 and has the specifications listed in Table 1.

TABLE 1

| | |
|---|---|
| SENSOR | 64 × 64 photodiode array |
| | 100 micron center-to-center spacing |
| | 0.25" × 0.25" image area |
| SPECTRUM | 0.2 to 1.10 μm |
| FRAME RATE | 200 to 12,000 frames/second |
| SATURATION LEVEL ON IMAGE PLANE | $50 \times 10^{-9}$ Joules/cm$^2$ |
| | 1,000 Lux with daylight source |
| DYNAMIC RANGE | 100:1 |
| EVENT DETECTION | Initiates data storage |
| | Automatic, based on programmable intensity and time profile and pixel subset |
| FRAME STORAGE | Live images continually read into memory |
| | Storage triggered by event detection or remote command |
| | 4,096 consecutive frames stored with storage start time selectable to occur before or after trigger |
| DISPLAY | TV image live at 30 frames/second |

TABLE 1-continued

| CONTROL | TV image of individual stored frame(s) with 1 to 9 frames/screen Frame rate, event detection parameters, display options, and storage options controlled via PC interface |
|---|---|

Figure 1:
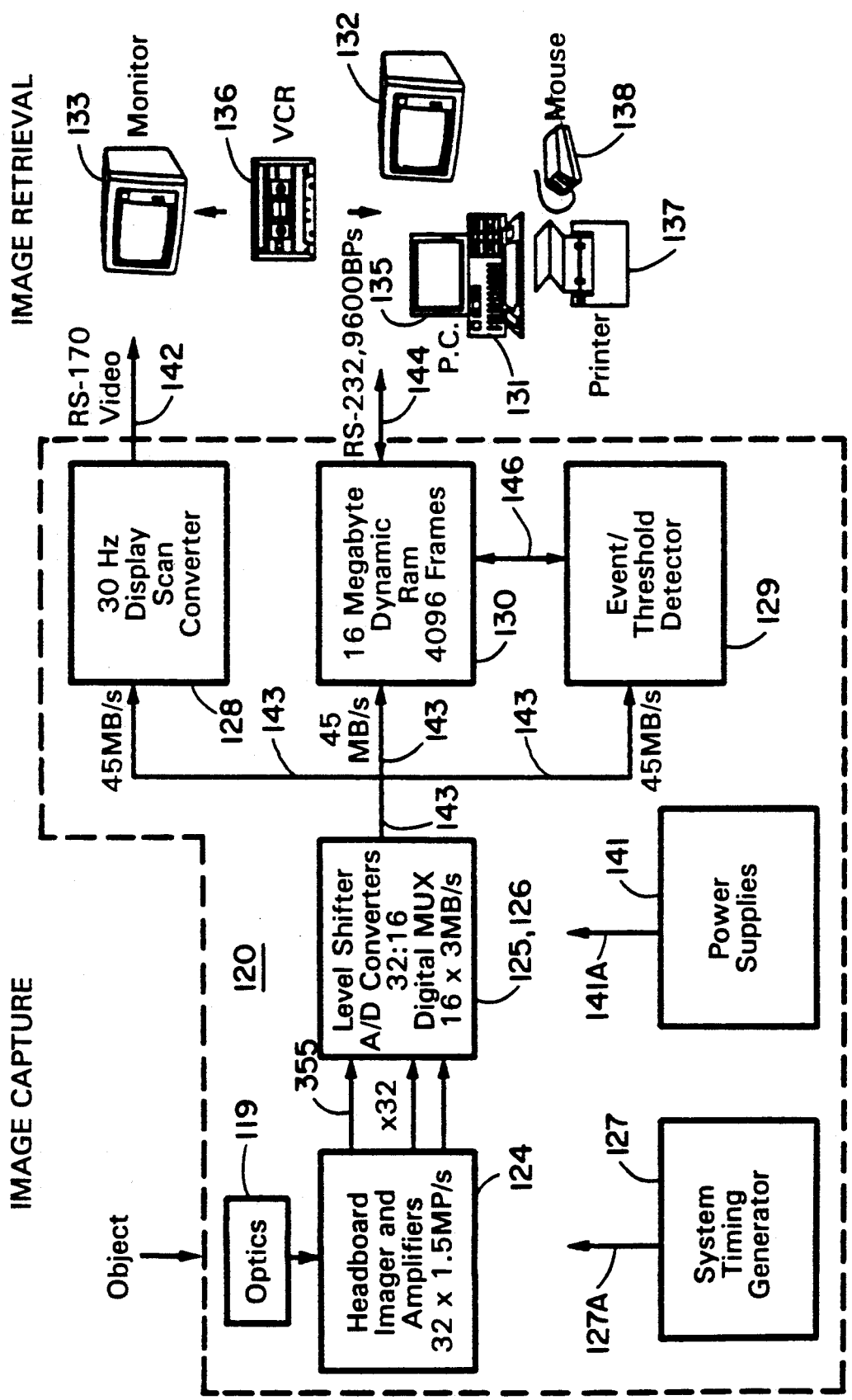
FIG. 1 is a system block diagram of a prototype of this invention for image capture and image retrieval.

A system block diagram is shown in FIG. 1. The video capture, event detection and frame storage functions are contained in one chassis 120 for the prototype version HFR 1264. A scene is brought to focus on the image plane of the photodiode array of headboard imager and amplifier 124 by optics 119. The headboard imager and amplifier 124 converts the focused image into electrical analog signals. The analog signals are sent via video outputs 355 to analog to digital converter and multiplexer 125, 126. After the 32 analog channels have been digitized they are multiplexed to 16 eight bit wide digital channels that are placed on the video bus 143 from which the remaining circuit cards display scan converter 128, Event/Threshold Detector card 129, and Video Capture Memory circuit card 130 receive their information. Operation of the HFR-1264 and display of the stored captured images are controlled via an RS-232 interface cable 144 connected to a computer 131 such as an IBM PC or compatible unit. Data are transferred over the RS-232 interface cable 144 at a typical rate of 9,600 baud. A mouse 138 is used for menu selection on the computer 131. Captured images are displayed on an RS-170 monitor 132 through a frame grabber circuit card (not shown) installed in the computer 131. From one to nine frames can be displayed on the screen of the monitor 132. In addition to displaying stored captured images, a 30-Hz scan converter 128 down-converts the high-frame-rate images to RS-170 images for continuous live monitoring of the system width video signal 142 on a separate monitor 133. These images can be recorded on a video-cassette recorder (VCR) 136.

Figure 2:
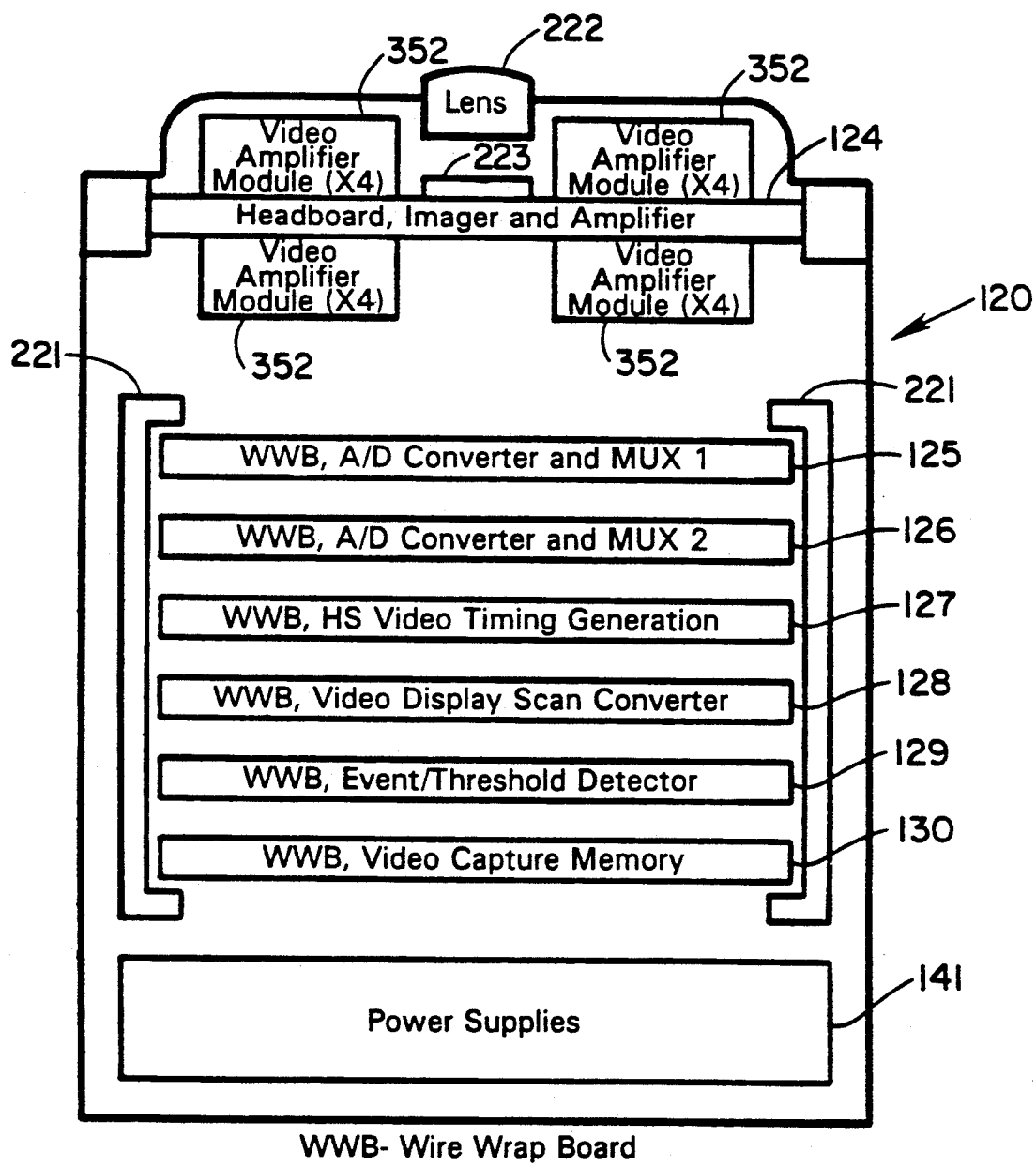
FIG. 2 is a schematic plan view of the prototype chassis and configuration of the seven circuit boards.

The prototype HFR-1264 chassis 120 contains seven separate circuit boards or cards 124-130, comprising headboard imager and amplifier 124, A/D converter and multiplexer 125, A/D converter and multiplexer 126, HS video timing generator 127, video display scan converter 128, event threshold detector 129, and video capture memory (16 megabyte dynamic RAM) 130, respectively, configured as shown in FIGS. 1 and 2. Six of the seven circuit cards plug into a backplane mounted in a card cage 221. The backplane (not shown) consists of a 128-line video bus 143, and a DC power bus 141A routed to each of the plug-in board connectors. System Timing and control signals are generated in the timing generation assembly 127 and provided to each of the circuit cards 124, 125, 126, 128, 129, and 130. Ribbon cables, not shown, are used to interface control signals 127A from circuit card to circuit card. The system operates from 115VAC, 60 Hz, supplied from a standard wall outlet to the power supply 141 in the chassis 120. All DC power is generated within the chassis 120.

An event detection profile, video capture start and stop commands, and video transfer to permanent storage and display are controlled by the operator using the computer 131. The software allows the operator to select the number of pixels to use for each of two event/threshold detection algorithms. The operator also programs the actual threshold level for each of the algorithms, and determines how many frames to keep prior to and after the event occurred. For each event, the system will store 4,096 frames in solid state memory. When an event is captured, the event frame number is displayed on the operator control terminal 135. The operator can choose to transfer up to 4,096 frames for display and permanent storage on hard or floppy disk. Copies of the data can be obtained on a printer 137. Images from the frame grabber can be stored in the VCR 136.

The camera was configured to collect images at rates up to about 12,000 frames per second although the camera has been operated at frame rates as high as about 22,000 frames per second.

The optics 119 comprises primarily a lens 222. The lens 222, a P. Angenieux 10×25B, is mounted to a headboard assembly 124. The focal length of the lens 222 is adjustable from 25 mm to 250 mm. The imager 223 is an EG&G Reticon RA6464 photodiode array. This lens 222, combined with the imager 223, permits adjustment of the object plane resolution from 4 milliradians to 0.4 milliradians. Subsequently, the field of view (FOV) is variable from 256 mr to 25.6 mr, respectively. The f/number of the lens 222 is variable from f/4 to f/22, and focus can be set from 1.7 meters to infinity. Resolution and FOV trade offs can be made by those skilled in the art by selecting a different lens.

The EG&G reticon imager 223 is sensitive between wavelengths of 0.2 microns and 1.1 micron. An optical window, not shown, is mounted on the imager 223 that limited the sensitivity to 0.3 microns.

The camera is comprised of five circuit cards 124-128. Two circuit cards 129, 130 are used to detect an event and store corresponding pre-event, event, and post-event frames. Circuit cards 125-130 are wire wrap boards. Each of the circuit cards are described below.

Figure 3:
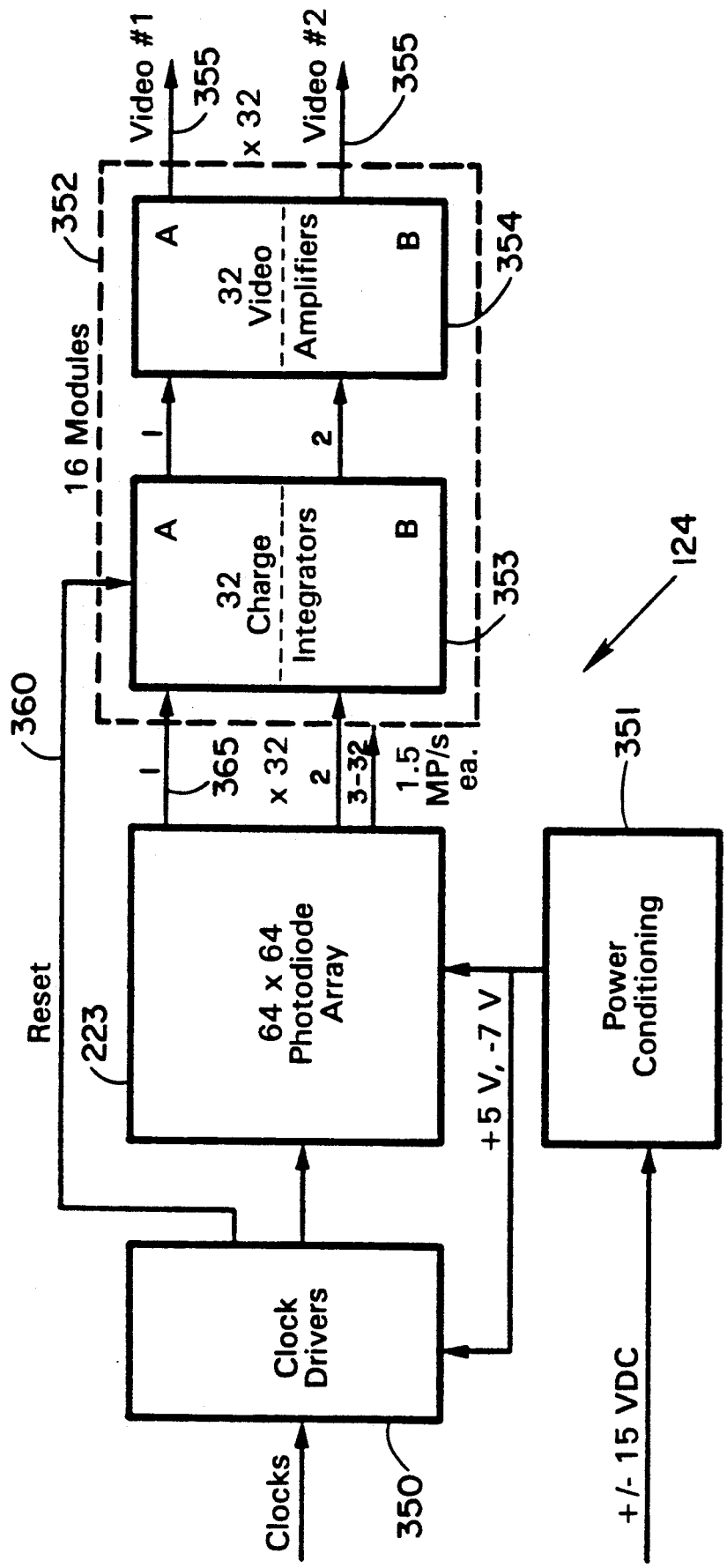
FIG. 3 is a block diagram of the prototype video headboard, imager, and amplifier.

A block diagram of the headboard imager and amplifier 124 is shown in FIG. 3. The headboard imager and amplifier 124 contains the imager 223, and imager support electronics including clock drivers 350, imager power conditioning 351, and sixteen identical integrator/amplifier modules 352. Clock drivers 350 provide the proper voltage levels to operate the imager 223 and reset signals via line 360 to the charge integrators 353. The imager 223 comprises a 64×64 pixel array and the output consists of 4,096 discrete charges, with each charge proportional to the photon energy incident on a pixel. The output charge is transferred to charge integrators 353 over thirty-two low capacitance printed circuit card lines 365. Each of the sixteen integrator/amplifier modules 352 has two video channels, each channel consisting of a charge integrator 353 (A or B) and a voltage amplifier 354 (A or B). A typical arrangement for one module for channels 1 and 2 is shown in FIG. 3. In like manner, identical arrangements (not shown) operate on channels 3-32 for a total of sixteen modules. The thirty-two video outputs 355 of the headboard 124 are coupled to the analog to digital (A/D) Converter and multiplexer (Mux) circuit cards 125, 126 at a line rate of 1.28 megapixels per second when the camera is operated at 10,000 frames per second. Appropriate adjustments for higher or lower frame rates can easily be made.

Figure 4:
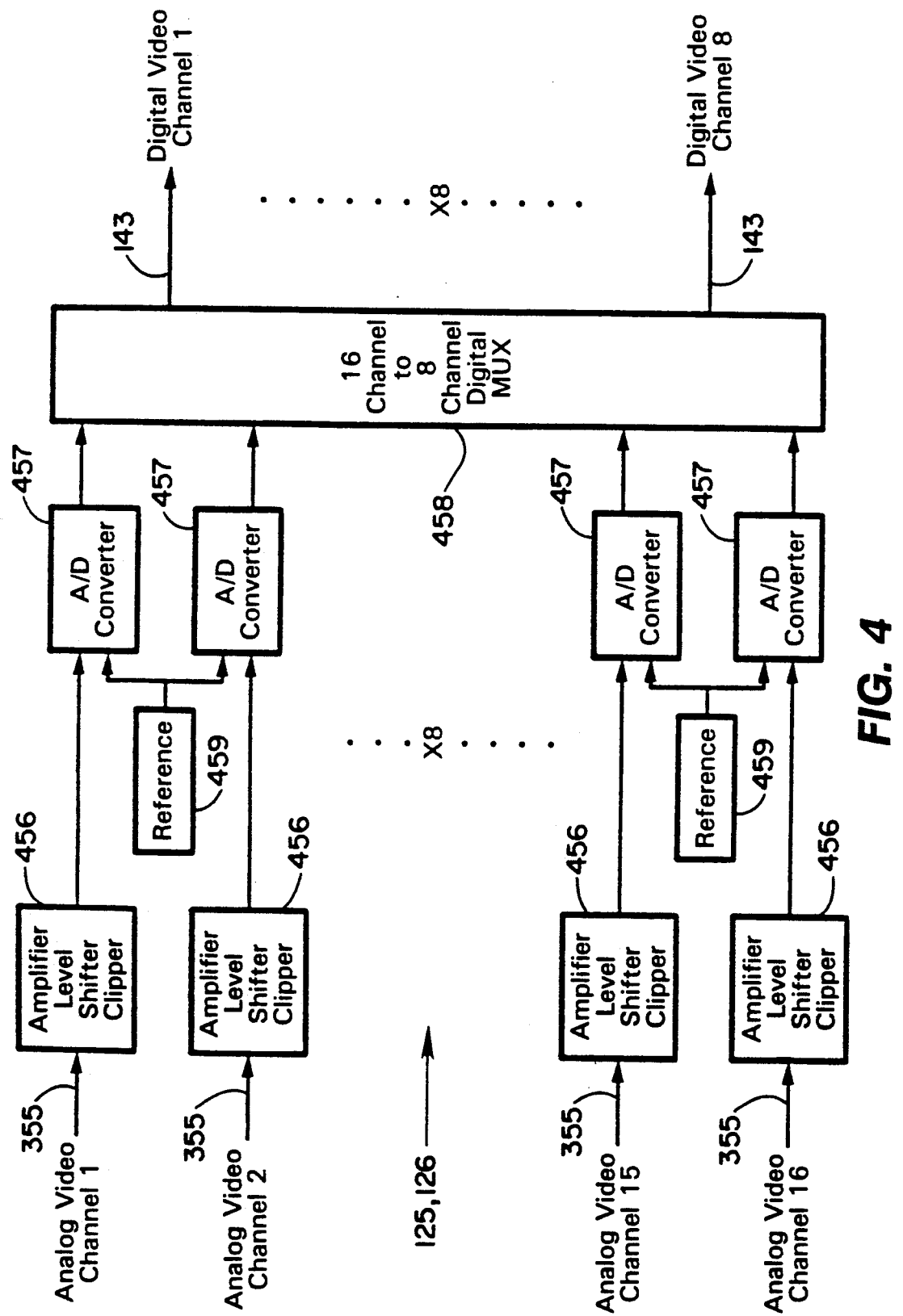
FIG. 4 is a block diagram of the analog to digital converters and multiplexers.

The two A/D Converter and Mux circuit cards 125, 126 are identical and interchangeable. A block diagram of one of the A/D Converter and Mux assemblies 125 or 126 is shown in FIG. 4. The A/D converter and Mux assembles each consist of sixteen amplifier/level shifter/clippers 456, sixteen 7-bit A/D converters 457 and a 16-channel to 8-channel digital multiplexer 458. The sixteen A/D converters 457 are provided reference signals from eight references 459. The combined outputs of the two A/D converter circuit cards 125, 126 form a 16-channel 8-bit video data bus 143 operating with a bus data rate of 40.96 Mbytes per second when the video frame rate is 10,000 frames per second. The A/D converter circuit board 457 is designed to be able to operate at over 22,000 frames per second.

Figure 5:
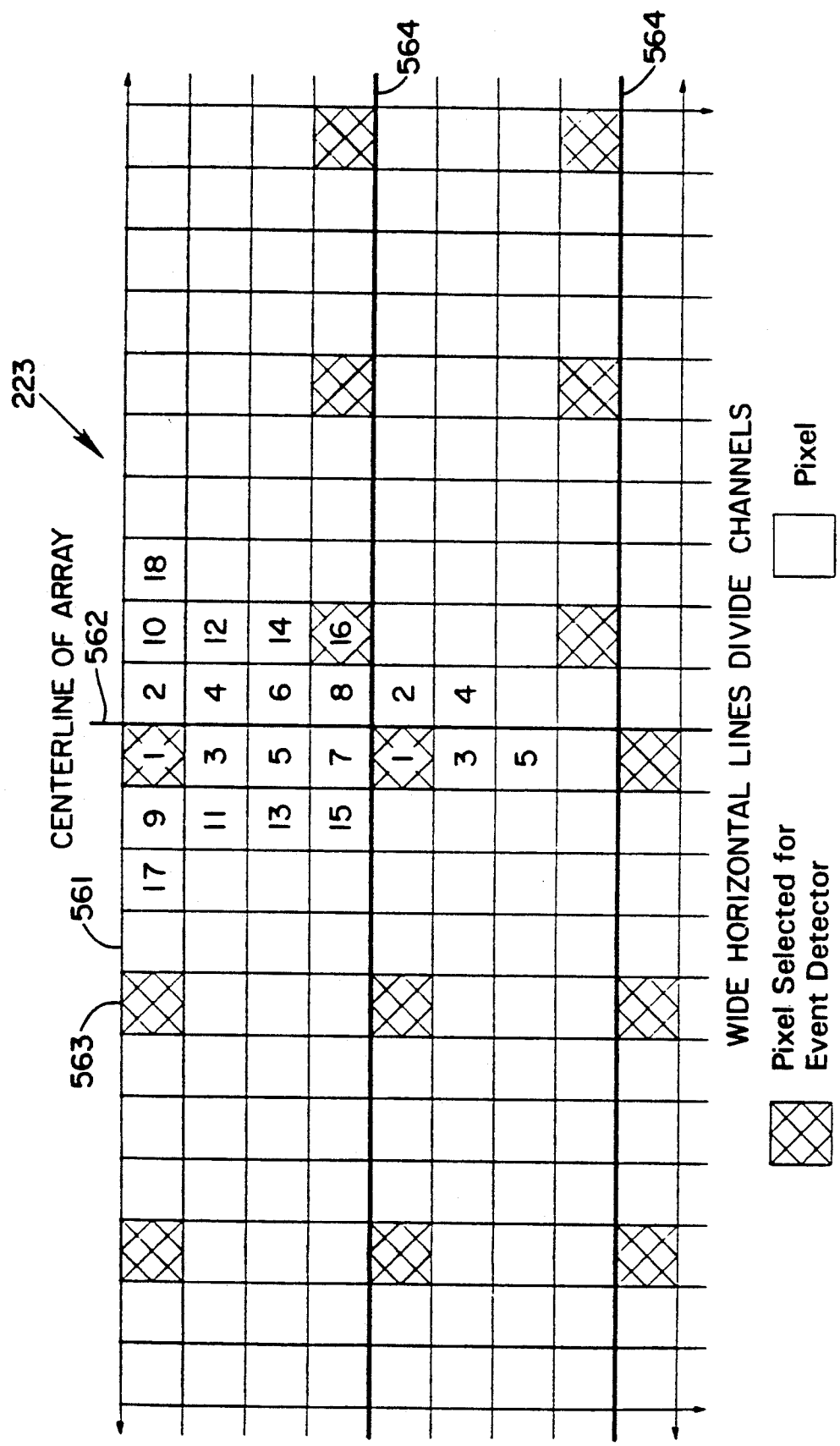
FIG. 5 is a partial schematic of the imager showing the pixel selection for the event detector.

The method of readout of the imager 223 is illustrated in FIG. 5 which is a schematic of the central upper portion of the imager array. The cross-hatched pixels 563 are typical sample pixels selected for the event detection and will be discussed later. A wide vertical line 562, at the center line of the array, and wide horizontal lines 564 divide the array into channels for purposes of discussion only. The 64×64 array of the solid state imager 223 contains 4,096 pixels 561, 563 that are arranged for readout on thirty-two analog video channels 355 and after conversion from analog to digital are multiplexed into sixteen channels forming the digital video data bus 143. To the left of the center line 562 of the array, there is a sub-array of 32×4 pixels forming analog channel "#1 odd" for pixels odd numbered 1 through 127 in the numerical order addressed. To the right of the center line 562 of the array in the upper right corner there is a sub-array of 32×4 pixels forming analog channel "#1 even" for pixels even numbered 2 through 128 in the numerical order addressed. Pixels 1 and 2 are read simultaneously followed by pixels 3 and 4. After conversion from analog to digital, channel "#1 odd" is interleaved with channel "#1 even" in the multiplexer 458 to form digital channel #1 containing serial signals from 256 pixels in the top four rows of the imager 223. Digital channels #2 through #8 are formed in the same manner.

The Timing Generation Assembly 127 initiates the high-speed camera during power up or reset, and generates the timing signals required for imaging, image readout, and A/D conversion for frame rates up to 22,000 frames per second via bus 127A. It also provides via bus 127A frame synchronization signals and video strobes to all the circuit cards that access the sixteen-channel video bus 143. All timing is fully synchronous, derived from a crystal oscillator (24 MHz for 11,000 frames-per-second frame rate). All timing signal outputs are differentially driven for improved timing integrity.

Figure 6:
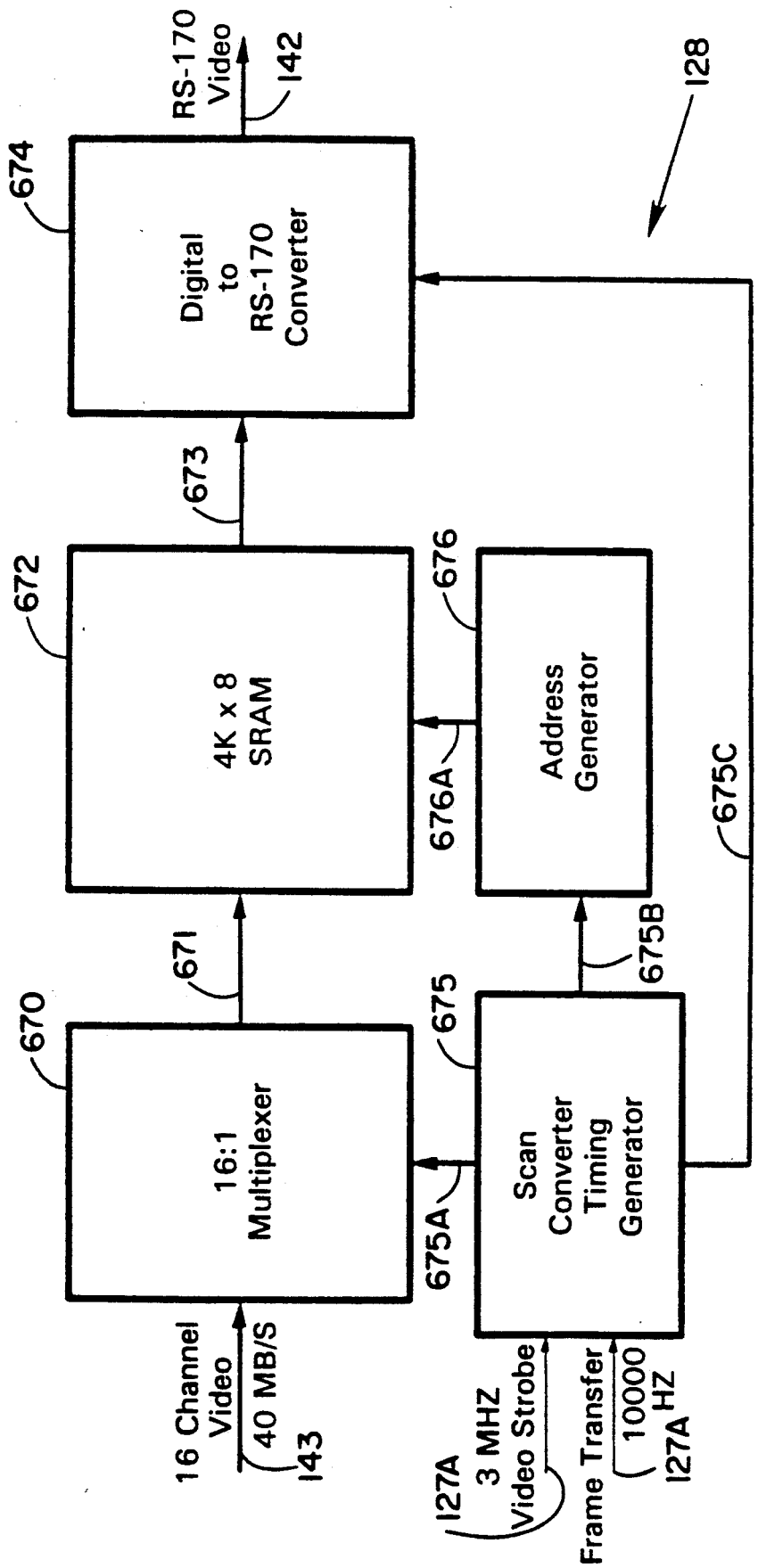
FIG. 6 is a block diagram of the 30-Hz, frame-rate-display, scan converter.

A block diagram of the display scan converter 128 is shown in FIG. 6. The 30-Hz scan converter 128 samples the high-frame-rate video from the sixteen-channel digital video bus 143 and produces a 30-frames-per-second rate video output signal in RS-170-like format via video cable 142.

The scan converter 128 comprises a 16:1 multiplexer 670 which converts the 16-channel digital video signal from bus 143 to a single channel video signal. The latter is fed via line 671 to a static random access memory (SRAM) 672 of 4,096 bytes. A scan converter timing generator 675 provides the time sequences necessary for the scan conversion process via lines 675A,B,C. An address generator 676 provides address signals to the SRAM 676 via line 676A. The output signal of the SRAM 672 is fed to a digital-to-RS-170 converter 674 via line 673.

When the output signal of the scan converter 128 is connected to an RS-170 compatible video monitor 133, the scene that is imaged on the photodiode array can be monitored continuously. To allow for setup of the camera optics prior to capturing an event, the output of the scan converter is normally connected via video cable 142 to a monitor 133 and used to set the light level and focus the object. It can also be connected to a VCR recorder 136 for a 30-frames-per-second rate record of an event that was captured at a higher frame rate. The raster output at video cable 142 of the scan converter 128 is a raw image, uncompensated for fixed pattern noise, or DC offsets that exist at the input to the A/D converters 125, 126. This makes the image produced by the scan converter 128 ideal to monitor for video gain and offset alignments testing.

Figure 9:
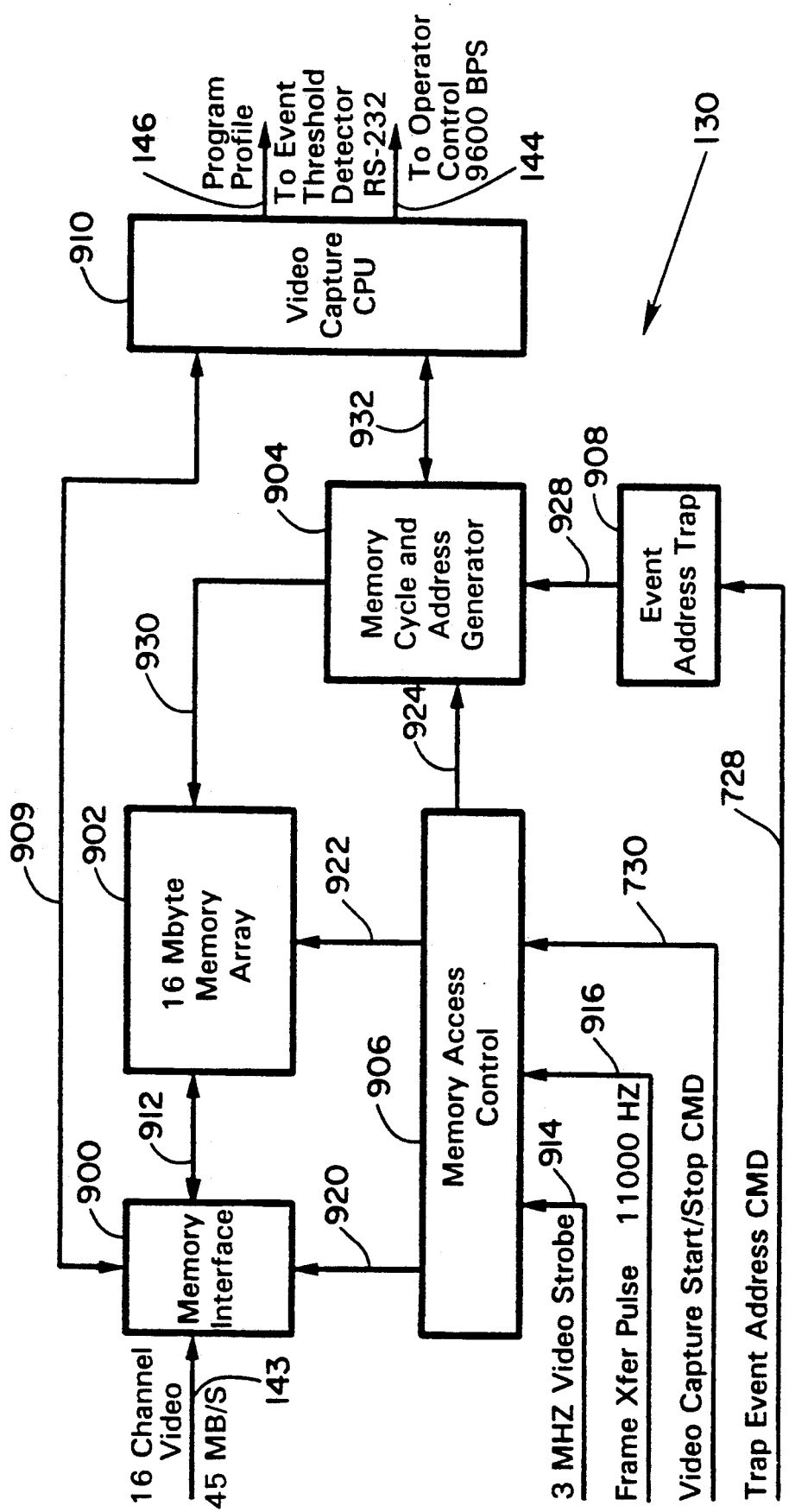
FIG. 9 is a block diagram of the video capture memory.

The video capture memory card 130, see FIG. 9, provides 16 Mbytes of temporary storage for 4,096 images or frames. This latter card 130 also contains a local Central Processing Unit (CPU) 910 to handle interfacing signals via interface cable 144 between the operator PC 131 and the HFR-1264 chassis 120. The video capture memory card 130 and the Event/Threshold Detector card 129, see FIG. 7, are interconnected for transfer of signals via bus 146.

The Event/Threshold Detector Circuit card 129 receives event profile information from the operator PC 131 via the RS-232 interface cable 144 from the Video Capture Memory Circuit card 130. When the HFR-1264 is placed in the event sample mode, the Event/Threshold Detector card 129 monitors the video data bus 143, and based on the operator programmed event criteria, senses whether or not an event has occurred. If an event has occurred in the current frame being monitored, the Event/Threshold Detector card 129 commands the Video Capture Memory card 130 to report the frame number in which the event occurred to the operator PC 131. The Event/Threshold Detector card 129 then counts frames until the number of post event frames indicated in the program profile has been stored in memory at the video capture memory board 130 and then commands the Video Capture Memory card 130 to discontinue recording.

The Event/Threshold Detector card 129 is programmed to sample selected pixels from the imager 223 to detect a change in scene. For example, referring to the cross-hatched sample pixels 563 shown in FIG. 5, the program can sample one pixel 563 out of each 4×4 pixel area or a total of 256 sample pixels 563 for one frame of the imager 223.

Figure 7:
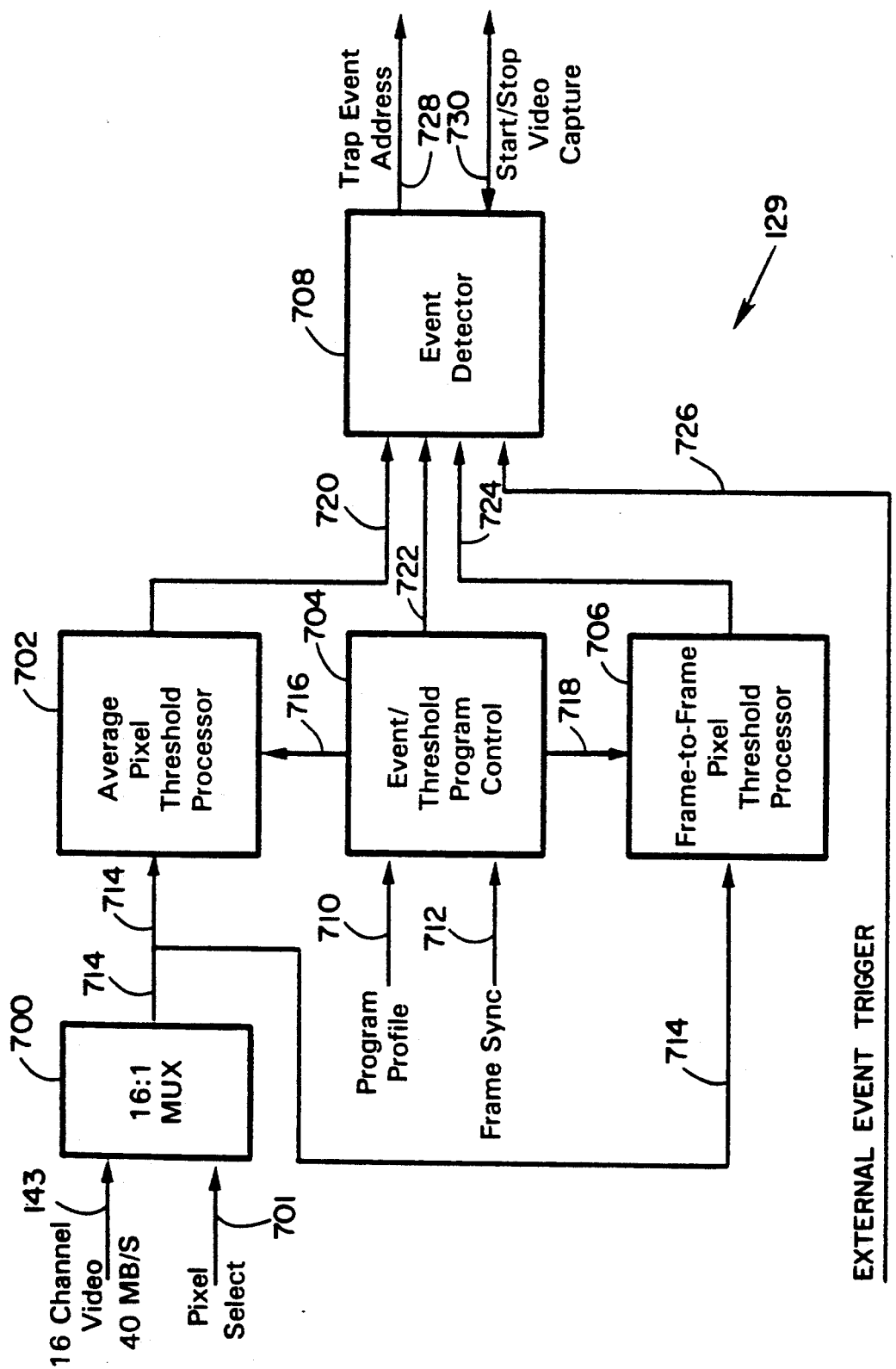
FIG. 7 is a block diagram of the event/threshold detector.

A block diagram of the Event/Threshold Detector card 129 is shown in FIG. 7. A 16:1 multiplexer 700 receives the 16 channel video input 143 and the program 701 of pixels selected to be sampled. The sampled video output 714 is directed to an average pixel threshold processor 702 and to a frame to frame pixel threshold processor 706 which operate in parallel. The event/threshold program control 704 receives the program profile 710 via bus 146 and the frame synchronization 712 as input and provides program outputs 716, 718 to processors 702, 706 respectively and program output 722 to the event detector 708. The outputs 720, 724 of the processors 702, 706 are combined in the event detector 708 to detect the initiation of an event and provide trap event address signal 728 and start/stop video capture signal 730 to be sent to the video capture memory card 130 via bus 146. In addition to the above automatic triggering circuit, provision is made for an alternative external event trigger signal to be sent to the event detector 708 via line 726.

The method and logic for detecting the initiation of an event is versatile and applicable to a variety of different events. By using three parallel 16-bit slice processors, the following two threshold algorithms are used to determine whether an event, as defined by the program inputs has occurred.

For each sampled pixel ($I_s$) 563, $I_s$ the average value is calculated over the previous 64 frames, or, $$\bar{I_s}(K) = \frac{1}{64} \sum_{N=K-65}^{N=K-1} I_s(N).$$

where $K$ is the current frame number.

A pixel average threshold T(avg) is exceeded when $I_s(K) - \bar{I_s}(K) > T(avg)$. A counter value T(count) is increased by one for each time the average threshold value is exceeded. This counter is used to determine how much of the image is exceeding the average threshold level.

In parallel with the above process, for each sampled pixel 563, a frame-to-frame value comparison is also performed.

A frame-to-frame threshold T(f-f) is exceeded when $I_s(K) - I_s(K-1) > T(f-f)$.

A counter value T(count f-f) is incremented by one for each time the frame-to-frame threshold value is exceeded, again to determine how much of the image is exceeding the frame-to-frame threshold.

An event is detected if T(count) > T(count allowed average) and T(count f-f) > T(count allowed f-f) in the same frame.

When an event is detected by the conditions stated above, the address of the memory location being written to at that time is latched into a register in the Video Capture Memory Circuit Card 130.

The latched address is used to determine the frame number or location in memory which holds the event frame. The above process is completed within one frame time, or for a 10,000 frames-per-second rate, within 100 microseconds.

The event/threshold card 129 continues to count frames in groups of sixteen until N(keep) * 16 frames have been written into memory after the event occurred. The event/threshold card 129 then prevents the memory card from storing more new images until reprogrammed to do so.

Figure 8:
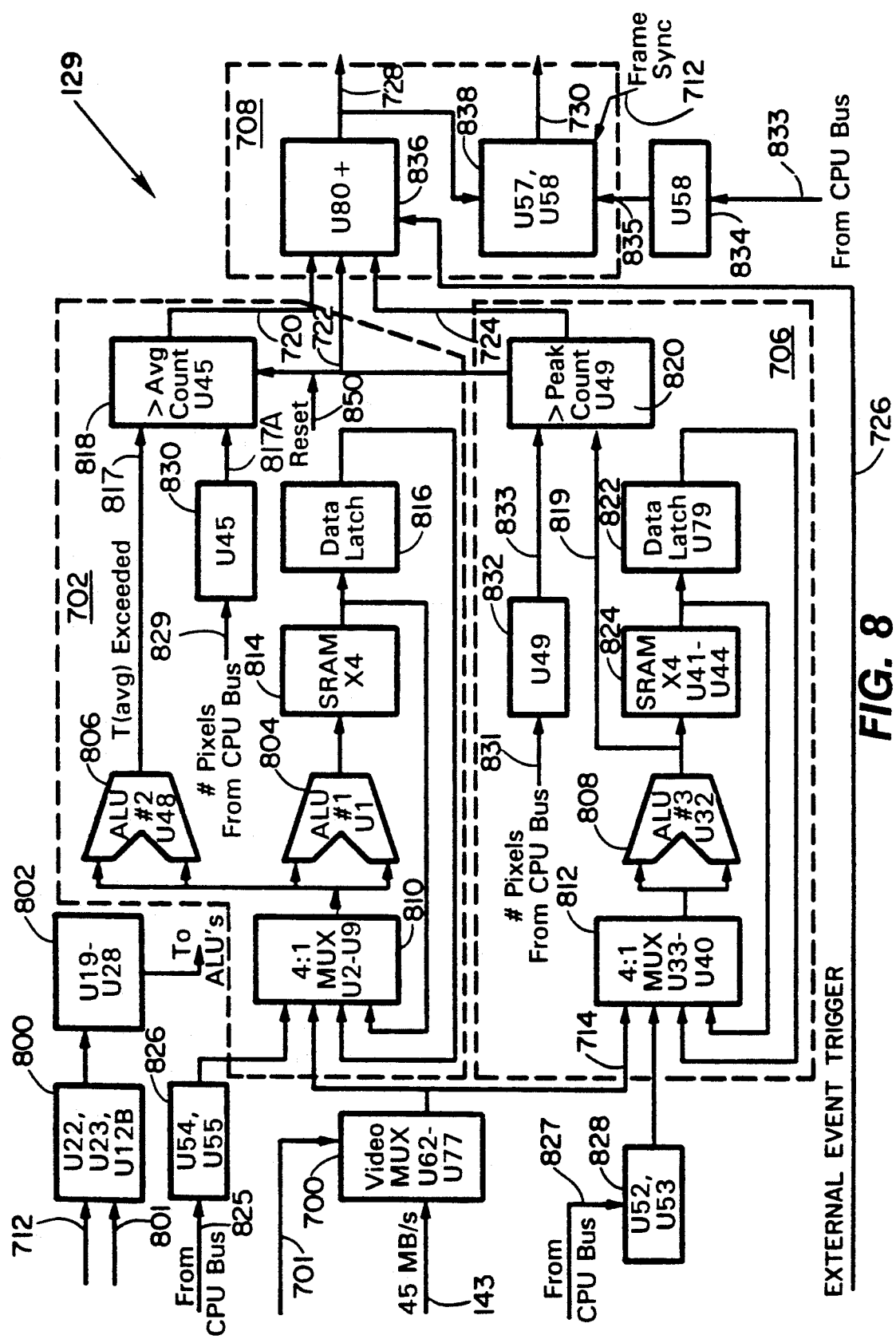
FIG. 8 is a detailed block diagram of the event detection processor.

FIG. 8 is a detailed block diagram of event threshold detector 129. The principal components are identified in the blocks and further identified by accompanying numbers prefixed by the letter U (e.g. U1, U2, etc.) which refer to the associated actual schematic diagram in the Appendix.

The event/threshold program control 704 comprises a program counter 800 which is used to address a stored program 802 comprised of eight Read Only Memories (ROMs). These ROMs contain the microsequenced program for three 7C9101 Arithmetic Logic Units (ALUs) 804, 806, 808. ALU#1 804 and ALU#2 806 process pixel average threshold comparisons; ALU#3 808 processes frame to frame threshold comparisons.

The Event/Threshold Program Control 704 receives the program profile 710 via line 146 from a microcontroller located on the Video Capture Memory card 130 which receives input signals via CPU bus 144 from the operator PC 131. The input includes the operator selected values stored in program latches 826, 828, 830, 832, 834. The average threshold value T(avg) 825 is stored in latch 826. The peak threshold value T(p-p) 827 is stored in latch 828. The value of the threshold count allowed average T(count allowed avg) 829 is stored in latch 830. The value of the threshold count frame to frame (T count f-f) 831 is stored in latch 832. The value of frames to keep N(keep) 833 is stored in latch 834.

When the Event/Threshold Detector 129 is enabled by an on/off signal 801 from the PC operator, the Video Capture card 130 is enabled by a control line 730 from the post event frame counter 838. The program counter 800, supplied by a frame synchronizer signal 712 at 12 MHz, begins to sequence, and the threshold level value T(avg) 825 in latch 826 is loaded into internal register #3 of ALU#2 806 via a 4:1 multiplexer 810. At the same time, the threshold level value T(f-f) 827 in latch 828 is loaded into internal register #3 of ALU#3 808 via 4:1 multiplexer 812.

The Video Strobe 701 (or sample pixel selector) simultaneously latches the digital equivalent pixel amplitude of sixteen of the cross-hatched sample pixels 563 shown in FIG. 5 into the 16:1 8-bit Video MUX 700. For example, pixel #1 of each of the 16 video channels is latched using the same video strobe. Each of the 16 pixels latched is processed one at a time in three 12 MHz clock cycles.

The average pixel threshold processor 702 comprises ALU#1 804, four AM9150 static random access modules (SRAM) 814, a data latch 816, ALU#2 806 and the pixel average counter 818. The frame to frame pixel threshold processor 706 comprises ALU#3 808, four AM9150 SRAMs 824, a data latch 822 and a frame to frame counter 820.

The method of operation is as follows:

(1) The video level of the selected pixel is loaded into internal register #1 of ALU #1 804, ALU #2 806, and ALU #3 808.

(2) The following arithmetic operations take place during a parallel operation:

| | |
|---|---|
| ALU1: | Value(Register2) = Value(Register1) − Pixel(avg) |
| ALU2: | Value(Register2) = Value(Register1) − Pixel(avg) |
| ALU3: | Value(Register2) = Value(Register1) − Pixel(f-f) |
| | Value[SRAM(ALU output)] = Value(Register1) |

(3) The following arithmetic operations take place during the next parallel operation:

| | |
|---|---|
| ALU1: | Value[SRAM(ALU output)] = Value(Register2) + 64*Pixel(avg) |
| ALU2: | If Value(Register3) − Value(Register2) < 0, then F15(sign bit) = 1. (T(avg)EXCEEDED = 1) |
| ALU3: | If Value(Register3) − Value(Register2) < 0, then F15(sign bit) = 1. (T(f-f)EXCEEDED = 1) The T(avg)EXCEEDED and T(f-f)EXCEEDED signals are used as inputs to two event size-threshold detectors, described below. |

The P(avg) event size-threshold counter 818 operates as follows: Each time T(avg)EXCEEDED is activated a signal 817 increments counter 818. Counter 818 is preloaded by signal 831 from program latch 830 at the beginning of each frame with a value of 255−T(count allowed avg), where T(count allowed avg) is an operator programmable value ranging from 0 to 255. If T(avg)EXCEEDED is activated more than T(count allowed avg) times during a single frame, the ripple carry output 720 is ANDED in trap event latch 836 with the output 724 of the P(f-f) event size-threshold counter 820. The P(f-f) event size-threshold counter 820 operates in a similar manner as described above for counter 818. Counter 820 is preloaded by signal 833 from program latch 832 at the beginning of each frame with a value of 255-T (count allowed f-f) where T(count allowed f-f) is an operator programmable value ranging from 0 to 255. Each time T(f-f)EXCEEDED is activated, a signal 819 increments counter 820. If T(f-f) EXCEEDED is activated more than T(count allowed f-f) times during a single frame, the ripple carry output 724 is ANDED in trap event latch 836 with the output 720 of the P(avg) event size-threshold counter 818.

If both the outputs 720, 724 of event size-threshold counters 818, 820 are activated during the same frame, an event is considered to have occurred. The trap event latch 836, provides a signal 728 that commands the video capture memory card 130 to latch in a register the memory address of the 16-channel by 8-bit memory word that is being written to at the time of event detection. After an event is detected, the post event frame counter 838, is incremented as follows: A 4-bit binary counter clocks an 8-bit binary counter once for each increment of 16 post event frames. The 8-bit counter was preloaded by signal 835 from program latch with a value of 255-N(keep), where N(keep) is the number, in 16-frame multiples, of post event frames that the operator has programmed the system to store. When the 8-bit binary counter has incremented N(keep) times, Video Capture is discontinued by a command signal 730 from the 8-bit counter in the Post Event Frame Counter 838 to the video capture memory card 130.

The above processes described in detail are performed on sixteen—16-pixel bursts, for a total of 256 pixels per frame. These bursts take 49 clock periods at 12 MHz for a burst time of 4.08 microseconds. These bursts are spaced apart by 15 or 17 video bus clock periods. For example, the burst that contains the 16th pixel from each of the 16 video channels occurs 15 video bus clock periods after the burst that contains the first pixel from each of the 16 video channels. Similarly, the burst that contains the thirty-third pixel from each of the video channels occurs 17 video bus clock periods after the burst that contains the sixteenth pixel of each of the video channels. When the camera is operated at a 10,000 frames per second, the video bus clock frequency is 2.72 MHz. Thus, the time between bursts is either 5.5 microseconds or 6.25 microseconds and a burst can be processed in 4.08 microseconds using a 12 MHz clock.

If the 12 MHz clock used in the prototype were replaced with a 33 MHz clock, the bursts could be processed in 1.48 microseconds rather than 4.08 microseconds. Since processing a burst would require only 1.48 microseconds, and the time between bursts is at least 5.5 microseconds, the Event/Threshold Detector card 129 could process 64 by 64 pixel arrays at frame rates above 20,000 frames per second. Also the increased processing speed with a 33 MHz clock suggests that larger 2-D image arrays can be processed using this same architecture. The processor operating at a 33 MHz clock rate is only 27 percent loaded which indicates that the processing capability of the event/threshold architecture is about twice the current 64×64 array size at 12,000 frames per second making larger arrays feasible.

A block diagram of the video capture memory card 130 is shown in FIG. 9. A 16 Mbyte memory array 902 provides temporary storage for 4,096 images or frames taken from the 16 channel video bus 143 via the memory interface 900. Video bus 912 transfers data between memory interface 900 and the 16 Mbyte megabyte memory array 902. The memory access control 906 receives as input a 3 MHz video strobe signal 914, frame synchronization pulses 916 and the video capture start/stop command signal 730 from the Event/Threshold Detector card 129 via bus 146. The memory access control 906 provides control signals 920 to the memory interface 900, control signals 922 to the memory array 902 and control signals 924 to the memory cycle and address generator 904. Memory Cycle and Address Generator 904 generates addresses to the 16 Mbyte memory array 902 for each of the memory cycles.

The circuit of the video capture memory card 130 includes an 8-bit microcontroller as a local Central Processing Unit (CPU) 910 to handle interfacing between the operator PC 131 and the HFR-1264 chassis 120 via the RS-232 interface cable 144, typically at 9,600 baud. The CPU 910 is also used to locally program the event threshold detector card 129 via bus 146. A trap event command signal 728 is stored in the event address trap 908 which in turn is connected via line 928 to the memory cycle and address generator 904. The CPU 910 is also used to locally program the memory modes via connections 909 and 932 to the memory interface 900 and memory cycle and address generator 904 respectively.

When the memory is programmed to store images, the storage timing is controlled by the system video strobe 914 and frame synchronization 916 signals. These signals come from the system timing generator 127 via bus 127A. Video data 143 are transferred to the video capture memory array 902 during 94 percent of a frame time. The remaining six percent of a frame time is set aside for memory refresh cycles. Refresh control as well as the memory read and memory write address controllers are implemented using programmable logic arrays.

Figure 10:
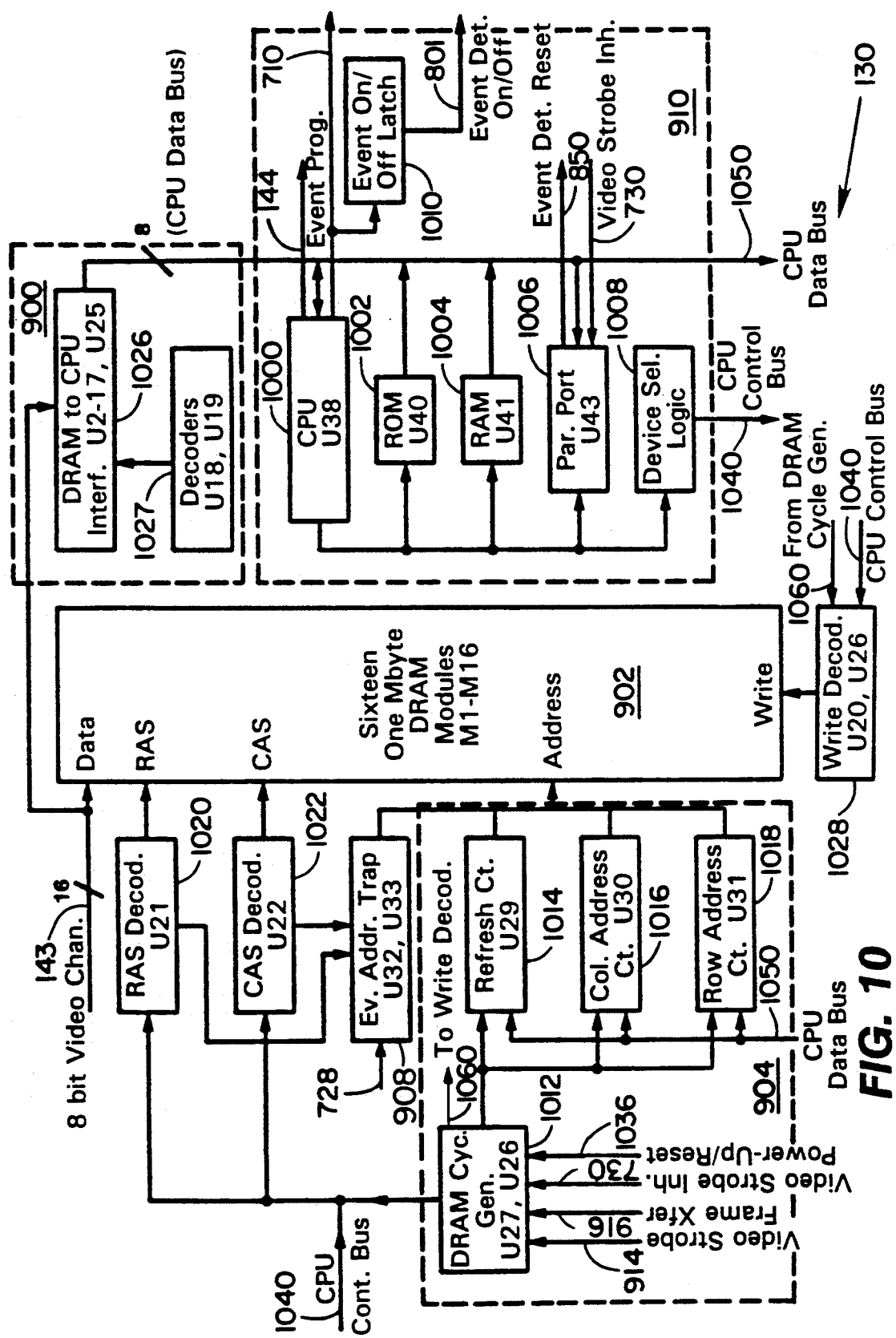
FIG. 10 is a detailed block diagram of the video capture memory.

A detailed functional block diagram of the video capture memory circuit card 130 is shown in FIG. 10. The reference designators of key components prefaced by the letter U for each subsystem are provided within the subsystem blocks. The detailed schematic diagrams are provided in the Appendix A.

The CPU 910 comprises an Intel 8032 microcontroller 1000, a ROM 1002, a RAM 1004, a parallel port 1006, and device select logic 1008. The microcontroller 1000 is used as a local CPU. It controls interfacing between the PC 131 and the HFR-1264 chassis 120 through the RS-232 interface cable 144. Commands from the PC 131 are interpreted by the microcontroller 1000 which then programs or controls the appropriate device in the recording system including interaction with the Event/Threshold Detector card 129. For example, the microcontroller 1000 provides the event program profile 710 and the event detector on/off signal 801 via the Event On/Off Latch 1010. The parallel port 1006 provides the Event Detector Reset signal 850 and receives the Video Strobe Inhibit signal 730. The CPU is also used to change the format of the images stored in the Video Capture Memory array 902 from a nonraster format to a raster format, and then transmit the images to the PC 131 over the RS-232 interface cable 144. The CPU program is ROM based.

The Video Capture Memory array 902 provides 16 Mbytes of temporary storage for the most recent 4096 images or frames off the video bus 143 and comprises 16 Dynamic Random Access Modules (DRAM) of type THM91000L each with 1 Mbyte of memory. The eight data lines to/from each of the 16 memory modules are tied directly to a channel from the video bus such that memory module #1 is tied to video channel #1, and memory module #2 is tied to video channel #2, etc.

The Memory Cycle and Address Generator 904 comprises the Refresh Counter 1014, Column Address Counter 1016, Row Address Counter 1018, and the DRAM Cycle Generator 1012 which receives as input the 3 MHz Video Strobe signal 914, Frame Synchronization signal 916 (both from generator 127), Video Strobe Inhibit signal 730, and the Power-Up/Reset signal 1036.

The Memory Access Control 906 comprises the Row Address Strobe (RAS) Decoder 1020, the Column Address Strobe (CAS) Decoder 1022, and the Write Decoder 1028 which receive input signals from the CPU Control Bus 1040 and interface with the DRAM 902.

The Memory Interface 900 comprises the DRAM to CPU Interface 1026 and the Interface Enable Decoders 1027.

When the system is placed in the video capture mode, the DRAM Cycle Generator 1012 receives Video Bus Strobes 914, and executes control over the Column address Counter 1016 and Row Address Counter 1018, and the RAS, CAS, and Write Decoders 1020, 1022, 1028. When the video bus signal 143 and Frame synchronization signal 916 is active, Row and Column Addresses and Write Decode timing signals are shared by all 16 memory modules. Thus, a parallel 16-channel by 8-bit word is written into memory simultaneously, with each of the 16 memory modules having the same column and row address. The Row and Column Address Counters 1016, 1018 are incremented to generate only 256 addresses to load a video frame, or 4 kbytes of memory.

When the Frame Synchronization signal 916 is inactive while the DRAM cycle is in the video capture mode, the DRAM refresh cycles occur. The DRAM Cycle Generator 1012 disables the Row and Column Address Counters 1016, 1018, enables and increments the Refresh Address Counter 1014 and controls the RAS, CAS, and Write Decoders 1020, 1022, 1028. Memory refresh is accomplished by applying nine bit addresses on the address bus and clocking the RAS Decoder 1020 while the CAS Decoder 1022 is disabled. The RAS Decoder output is applied to all 16 of the memory modules, as is the refresh addresses.

When an event is detected, the Event Address Trap 908 receives the Trap Event Command signal 728 from the Event/Threshold Detector card 129. The Trap Event Command signal 728 is used to latch the address of the location in memory that data is being written to at that time. The video capture memory card 130 continues to write data from the video bus 143 into memory 902 until the Video Strobe Inhibit command 730 is received from the Event/Threshold Detector card 129. This command disables the video strobes 914 from the video bus to the DRAM Cycle Generator 1012 and is also used by the CPU 910 as an indication that an event has occurred, and the desired number of pre- and post-event frames have been captured. The CPU 910 reports the occurrence to the control PC 131 via the RS-232 interface cable 144.

Retrieval of the captured frames is initiated by the operator at the control PC 131. To retrieve frames, the operator selects the location and number of frames to transfer to the PC 131 for display. The CPU 902 on the Video Capture Memory card 130 receives this information and begins the retrieval process. Since the 8032 microcontroller 1000 can address only 64 kbytes of memory, it is not possible to directly access the 16 Mbytes of DRAM. The row and column address of the first pixel of the frame being retrieved is sent to the Row and Column Address Counters 1016, 1018 from the CPU 902 using four 1 byte segments. The RAS Decoder 1020, CAS Decoder 1022 and the CPU Interface 1026 are programmed to access only one of the 16 modules at a time. To increment DRAM addresses, the DRAM Cycle Generator 1012 is selected by the CPU 902, which increments the address counters 1014, 1016 and cycles the Row and Column Address Strobes 1020, 1022. This occurs 256 times per module. After a module has been read 256 times, the RAS Decoder 1020, CAS Decoder 1022 and the CPU Interface 1026 are reprogrammed by the CPU 902 to select the next module. The Row and Column Address Counters 1014, 1016 are reset to the address of the first pixel address by the CPU 902. After all 16 memory modules have been read 256 times, one complete frame of video data is stored in static RAM 1004 within the directly addressable memory space of the CPU 902. This data is read out of the static RAM 1004 in the form of a raster scan, and is converted from a binary format to an ascii format before sending it to the PC 131 over the RS-232 interface cable 144.

When the controller 1000 is accessing the DRAM 902, the 8155 parallel port internal timer 1006 is used to time refresh intervals. (This is not indicated on the block diagram; refer to Appendix for schematic). The Refresh control signal is sent to the DRAM Cycle Generator 1012, where it is latched. If the Dram Cycle Generator 1012 is being used by the CPU 910 to access DRAM 902 when the Refresh command is received, the DRAM Cycle Generator 1012 waits until the current memory cycle is finished, and then executes a refresh cycle. During this time, the CPU 902 is placed in a wait mode. Upon completion of the refresh cycle, the controller 1000 resumes execution of operations.

The storage rate limitation of the system is determined by how fast the DRAM modules 130 can be written to. The memory modules have an access time suitable for operation at 6 MHz using the early write mode, which is currently implemented in HFR-1264, and much faster using the page mode which is not currently implemented. In the case of the video capture memory, the limitation in memory write speed is not only due to the memory modules themselves. At least one other limitation is the DRAM Cycle Generator 1012. The DRAM Cycle Generator's Programmable Logic Device (PLD) currently limits the speed of memory access from the video data bus 143. In order to write at a 3.0 MHz rate per channel to memory, the DRAM Cycle Generator 1012 must operate at 24 MHz. The DRAM Cycle Generator 1012 would require a 40 MHz clock to operate at 6.0 MHz. The PLD used has a maximum frequency of operation of 28 MHz. Faster PLD's are available that can operate at frequencies as high as 80 MHz. The camera is capable of operation at speeds as high as 22,000 frames per second, as was determined early in the development of the system. The current HFR-1264 system can be improved to operate at maximum speed without substantially changing the system.

The operator's PC 131 consists of an IBM compatible AT style personal computer consisting of a 40 MByte hard drive, a high density 5" disk drive, and a 3.5" disk drive. The PC 131 is equipped with a PC Vision Frame grabber, and two RS-232 serial ports. Software for the HFR-1264 is primarily written in Turbo-C, though portions of the software are written in assembler and in Pascal. Pascal is used to interface with the PC vision frame grabber, due to the ease of adaption of several previously written programs. Assembly code was also used to interface with the PC Vision Frame grabber to speed the transfer of data to the frame grabber for display.

One of the RS-232 ports is used to interface the PC 131 with the HFR-1264. The other RS-232 port is used to interface a mouse 138 that is required to make menu selections.

The main program menu is used to select the various submenus. Several of submenus are not implemented, and can be used for custom applications. The non-implemented submenus include Zoom, Print, and Search.

The Scan submenu is used to bring in selected files from the HFR-1264 to be displayed in "Dither mode" on an EGA compatible monitor. Using this submenu, dithered images that have been captured can be displayed on the EGA monitor without the use of a frame grabber.

The Histogram submenu allows the user to display the histogram of a particular frame that has been brought in for display using the Scan submenu.

The Edit submenu is used to edit user selected pixel values within an image that has been retrieved using the scan menu.

The Sample submenu is used to program the event/threshold detection profile, and initiate HFR-1264 video capture mode. This submenu is essential and is detailed in a following section.

The Test submenu is used to test individual memory modules on the Video Capture Memory circuit card.

The View submenu is used to access the frame grabber file retrieval and display menus. This menu is also essential and will be detailed in a following section.

In addition to the menus, the bottom of the screen provides the user with a status display. The essential status fields are "Sys Mode", which gives the status of the video capture system, and the "Eve Frame #" field which tells the user where in memory the event frame is located.

The user first programs the event detector 129 by selecting each of the program parameters using the mouse 138 and entering the desired value for each parameter. The following list of parameters is used to define an event profile:

- # of avgpix—The number of pixels (0-256) that must exceed the average threshold level T(avg).
- # of peakpix—The number of pixels (0-256) that must exceed the frame-to-frame threshold level T(f-f).
- # of post frames—The number of post frames (0-256) that are desired. The number entered is multiplied by 16.
- avg & peakpix thresholds—The threshold levels (0-256). This is where each of the values, T(f-f) and T(avg) is entered.
- Start/Stop—This is the command to start the Video Capture Mode.

The Start command is given by clicking the mouse over the text. To stop execution, the mouse is again clicked over the text.

The View submenu allows for the retrieval and storage of images from the HFR-1264 120 and display of stored images on an RS-170 monitor 132 through the frame grabber. Images are brought in from the HFR-1264 120 and stored in individual files. Images brought in sequentially are stored with sequential file specifications. These file specifications are used to display images in the sequence in which they occurred during image capture. A compensation file can be brought in from the camera while the lens 222 is capped. This compensation file consists of the fixed pattern noise due to pixel-to-pixel offsets created by the imager 223. This fixed pattern is subtracted from frames that are brought in to greatly improve the quality of the image.

Each of the selections in the view submenu are described below.

(1) Communications—This selection is used for basic serial communications testing. Primitive camera commands can be issued and resulting data received in the communications mode. This selection is rarely used, and was created as an aid in developing the camera.

(2) Bring in File from Camera Memory—This selection allows the operator to set up parameters required to transfer image files from the HFR-1264 120 to the PC 131. The selections are defaulted to the last setting used, to allow the operator to change only the fields that need to be changed. There is a menu for configuring these file transfers and also the optional automatic display mode. When Optional display mode is used, the program will automatically configure data and display up to nine images through the frame grabber.

(3) Display Pictures—This selection allows the operator to display images that have been stored in image files. The operator uses the selection menu to select image size, quantity and location on a standard RS-170 monitor 132. The picture can be compensated or shaded optionally. For consecutively stored images, once the first image in a sequence has been displayed, other images can be displayed by simply pressing the space bar on the keyboard. The computer monitor gives display status information while the RS-170 monitor 132 displays the images.

A listing of the software source code for the HFR-1264 120 is provided in the Appendix. A flow chart for the View submenu is also included in the Appendix.

EXAMPLE

The demonstration of the HFR-1264 120 was designed to demonstrate the ability of the system to be programmed for an event, wait for the event to occur, and then capture images before, during and after the event. The event to be recorded was a firecracker exploding. The procedure used to record the firecracker explosion is described below:

(1) An N.D. 2.5 and a KG-3 filter were placed in front of the imager 223.
(2) The focal length of lens 122 was adjusted to between 180 and 250 mm, the focus was set for approximately 2 meters, and the f/stop was adjusted to approximately f/12.
(3) Sufficient lighting was directed onto the firecracker such that the outline of the firecracker could be seen through the filters at f/12. The above steps were performed to reduce the dynamic range of the firecracker explosion and to allow the firecracker to be seen during the entire event without a significant amount of pixel blooming.

(4) To capture the event, the event detector was programmed so that T(count allowed f-f)=T(count allowed avg)=25, T(avg)=T(f-f)=50.

(5) The firecracker was placed in a plexiglass box so that debris would be contained while the explosion was completely visible.

(6) The firecracker fuse was lit, and the firecracker exploded. The event frame was indicated on the PC monitor 135. Ten frames of the firecracker were transferred to permanent storage, including frames captured prior to, during, and just after the explosion. The captured frames were displayed on a monochrome monitor through the frame grabber within three minutes of when the images were captured.

The High-Speed Video Camera/Event Detection Recording System prototype was designed, and developed to operate at up to 12,000 frames per second. The prototype system has demonstrated capturing images automatically, and storing images that occurred before, during, and after the automatic capture command is given. The system is fully electronic (no moving parts), and uses an IBM compatible PC 131 for programming and control. The system can be implemented by those skilled in the art to operate at frame rates up to 22,000 frames per second using the same imager, and without major redesign considerations.

The system can be repackaged to allow the imager and amplifier assembly 124 to be remoted, and reduced in size. The wire-wrap circuit cards 125-130 can be converted to printed circuit cards which would require only half the space of the present chassis 120. A parallel interface cable 144 to the hard disk of the PC 131 can be implemented to reduce the data transfer time period. The software can be written to accommodate a wide variety of operator computers, or a computer circuit card could reside within the chassis.

In addition to the automatic event detection capabilities described previously for the prototype HFR-1264, the Event/Threshold Detector card 129 can be used to detect events that occur within specific areas of the camera field of view. For example, by simply inhibiting every other pixel select strobe 701, the left half (or the right half) of the imager 223 can be used to detect events while the other half will not. By making simple changes in the micro-codes that are programmed into the ROMs of the Event/Threshold Program Control 704 on the Event/Threshold Detector card 129, horizontal strips of the imager 223 can be enabled for event detection while other horizontal strips are disabled. Thus, any quadrant or a central portion of the imager 223 can be enabled to scan sample pixels 563 for events while other portions of the imager 223 do not. By making adjustments to the pixel select strobe 701, it is possible to locally increase the event detection sampling from one sample pixel 563 of every 4×4 pixel section to one sample pixel 563 of every 2×8 section of the specific area of the imager 223 being monitored. These features, which can be easily implemented by those skilled in the art having read the disclosure herein, can be used to increase the spatial sensitivity of the automatic event detection system when specific areas of the field of view are known to be more critical than others. This versatility of the system makes it possible to automatically capture events that might otherwise be extremely difficult to capture.

The Event/Threshold Detector card 129 of the prototype HFR-1629 uses both an average pixel threshold processor 702 and a frame-to-frame pixel threshold processor 706 operating in parallel to automatically detect an event. This is the preferred method of operation applicable to many types of events. However, it is also possible to use either the average pixel threshold processor 702 above or the frame-to-frame pixel threshold processor 706 alone to automatically detect an event. For example, to use only the average pixel threshold processor 702 a threshold value of T(count allowed f-f)=0 could be input as signal 831 to program latch 832 of the frame-to-frame pixel threshold processor 706. Thus, T(f-f)EXCEEDED would be activated each frame and the ripple carry output 724 would be ANDED in trap event latch 836 with output 720 of the P(avg) event size threshold counter 818. In effect, only the average pixel threshold processor 702 would be used to detect a change in scene. In a similar manner, only the frame-to-frame pixel threshold processor 706 could be used to detect a change in scene if desired.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit or scope of the invention.

We claim:

1. Video apparatus for providing records of selected types of images of high-speed events comprising:
   A. solid state imager means for receiving and converting focused images and providing an ordered series of digital signals representing sequential frames of images of scenes in which high-speed events may take place:
   B. solid state memory means for storing, at least temporarily, a portion of the digital signals;
   C. first comparative means responsive to the digital signals, for comparing values of individual pixels, in the digital signals being stored, with average preceding values of the individual pixels for a predetermined number of prior frames, and for incrementing an average event counter each time a comparison exceeds a predetermined threshold value, wherein the first comparative means operates on the digital signals from (A) in real time simultaneously with the solid state memory means (B);
   D. second comparative means responsive to the digital signals, for comparing values of individual pixels, in the digital signals being stored, with values of the individual pixels in a preceding frame, and for incrementing a frame-to-frame event counter each time a comparison exceeds a predetermined threshold value, wherein the second comparative means operates on the digital signals from (A) in real time simultaneously with the solid state memory means (B) and the first comparative means (C);
   E. average event counter means for providing a first output signal indicating when an average pixel threshold within a frame is exceeded a predetermined number of times;
   F. frame-to-frame event counter means for providing a second output signal indicating when a frame-to-frame pixel threshold is exceeded a predetermined number of times; and G. means responsive to the detection of an event by the counter means (E) and (F) when both counter means provide first and second output signals to indicate that their respective thresholds have been exceeded a predetermined number of times within the same frame, providing for retaining a portion or none of pre-event digital signals in solid state memory means (B) and storing additional and post-event digital signals that contain a record of the selected types of images.

2. The apparatus of claim 1, comprising programmable means for selecting frame rates from between about 200 to about 22,000 frames per second.

3. The apparatus of claim 1, comprising programmable means for selecting frame rates from between 10,000 to about 22,000 frames per second.

4. A method for providing records of selected types of images of high-speed events comprising:
   A. focusing an image on an image plane of a solid state imager;
   B. converting the focused image into an ordered series of digital signals representing sequential frames of images of scenes in which high-speed events may take place;
   C. storing, at least temporarily, a portion of the digital signals in a solid state memory;
   D. comparing the value of individual pixels, in the digital signals being stored, with average preceding values for the individual pixels for a predetermined number of prior frames, and incrementing an average event counter means each time a comparison exceeds a predetermined threshold value, whereby the comparison is made with the digital signals from (B) in real time simultaneously with the storing of the digital signals in (C);
   E. comparing the values of individual pixels, in the digital signal being stored, with values for individual pixels in a preceding frame, and incrementing a frame-to-frame event counter means each time a comparison exceeds a predetermined threshold value, whereby the comparison is made with the digital signals form B. in real time simultaneously with the storing in (C) and the comparing in (D);
   F. providing an output signal from the average event counter means when an average pixel threshold within a frame is exceeded a predetermined number of times;
   G. providing an output signal from the frame-to-frame event counter means when a frame-to-frame pixel threshold is exceeded a predetermined number of times; and
   H. detecting an event when both the average event counter means and the frame-to-frame event counter means have provided an output signal during the same frame and retaining a portion or none of pre-event digital signals in memory and storing additional event and post-event digital signals that contain a record of the selected types of images.

5. The method of claim 4, comprising programming and selecting a frame rate from between about 200 to about 22,000 frames per second.

6. The method of claim 4, comprising programming and selecting a frame rate from between about 10,000 to about 22,000 frames per second.

7. The apparatus of claim 1, comprising means for retrieving the stored digital signals for video display or recording of the images.

8. The apparatus of claim 1, comprising
   a. solid state imager means for receiving focused images and providing an ordered series of analog signals;
   b. conversion means for converting the analog signals to an ordered series of digital signals representing sequential frames of images of scenes in which high-speed events may take place.

9. The apparatus of claim 1, comprising means for video display and/or recording the stored digital signals representing the image scene at a slower frame rate than they were stored.

10. The apparatus of claim 1, wherein the solid state imager means comprises:
    a. photodiode means having an image plane and an amplifier for converting an image focused on the image plane to analog signals;
    b. converter means for converting the analog signals to digital signals.

11. The apparatus of claim 10, comprising optical means for focusing images on the image plane.

12. The method of claim 4, comprising retrieving the stored digital signals for video displaying or recording of the images.

13. The method of claim 4, comprising:
    a. converting focused images to an ordered series of analog signals; and
    b. converting the analog signals to an ordered series of digital signals representing sequential frames of images of scenes in which high-speed events may take place.

14. The method of claim 4, comprising video displaying and/or recording the stored digital signals representing the image scene at a lower frame rate than they were stored.

15. The method of claim 4, comprising:
    a. converting an image focused on the image plane of a photodiode array to analog signals; and
    b. converting the analog signals to digital signals.

16. The method of claim 15, comprising focusing images on the image plane with a lens.

* * * * *

UNITED STATES PATENT AND TRADEMARK OFFICE
CERTIFICATE OF CORRECTION

PATENT NO. : 5,301,240
DATED : April 5, 1994
INVENTOR(S) : Larry A. Stockumn and Ronald L. Gorenflo It is certified that error appears in the above-indentified patent and that said Letters Patent is hereby corrected as shown below:

Column 9, between lines 8 and 9, "$I_s(K)$" should be -- $\overline{I_s(K)}$ --.

Column 10, line 59, "831" should be -- 817A --.

Column 11, line 22, "latch with" should be -- latch 834 with --.

Column 18, line 37, "place:" should be -- place; --.

Column 19, line 8, "additional and" should be -- additional event and --.

Column 19, line 42, "form" should be -- from --.

Column 20, line 47, "lower" should be -- slower --.

Signed and Sealed this

Twentieth Day of September, 1994

Attest:

BRUCE LEHMAN

Attesting Officer     Commissioner of Patents and Trademarks